Jan. 22, 1952        T. L. DIMOND        2,583,328

CIRCUIT FOR CONTROLLING THE RELEASE OF A RELAY

Filed March 27, 1948

INVENTOR
T. L. DIMOND
BY
ATTORNEY

Patented Jan. 22, 1952

2,583,328

UNITED STATES PATENT OFFICE 2,583,328

CIRCUIT FOR CONTROLLING THE RELEASE OF A RELAY

Thomas L. Dimond, Rutherford, N. J., assignor to Bell Telephone Laboratories, Incorporated, New York, N. Y., a corporation of New York Application March 27, 1948, Serial No. 17,486

6 Claims. (Cl. 175—320)

This invention pertains to timing apparatus, and more particularly to circuits for controlling the release time of a relay.

The usual means for delaying the release of a relay armature involves the use of a short-circuited winding or copper slug on the relay core or the use of a specially constructed relay. The latter is expensive, and the former is difficult to adjust. An object of this invention is to provide a simplified and inexpensive means for controlling the release time of a relay of standard and simple construction. Additional objects of the invention are to obtain greater timing accuracy than can be obtained with ordinary condenser timed neutral relays and to provide a means for obtaining delay times longer than those obtainable with relays employing a shorted winding or copper slug. These and other objects of the invention will be apparent from the following description, the appended claims, and the drawings, in which:

Figure 1:
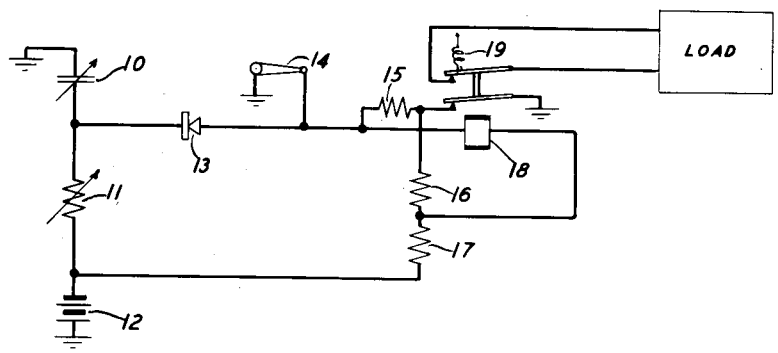
Fig. 1 is the basic circuit diagram of the invention.
Figure 3:
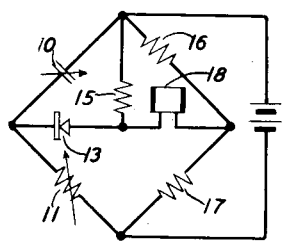

Fig. 3 indicates in bridge form the control circuit of Fig. 1, while switch 14 is open and the armature of relay 18 is operated.

In the preferred embodiment of the invention shown in Fig. 1 resistances 11, 15, 16 and 17 have values of 20,000, 30,000, 250 and 250 ohms respectively. The resistances of the winding of relay 18 is 4,000 ohms and the number of turns can be 23,000 turns. Capacitance 10 is 20 microfarads and battery 12 is 50 volts.

Figure 2:
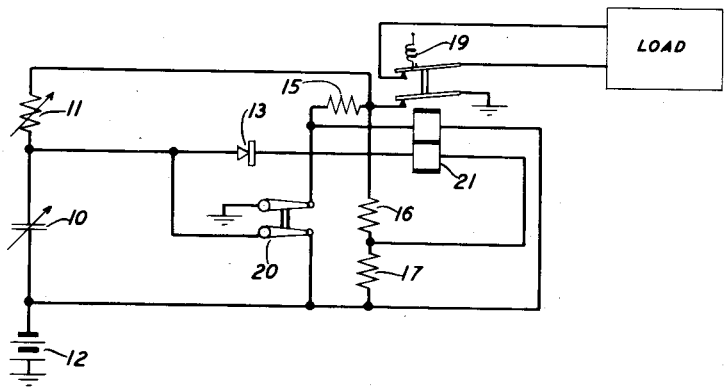
Fig. 2 is a modification of the basic circuit diagram.

An operable embodiment of the circuit shown in Fig. 2 can have the following values of circuit constants. Resistances 11, 15, 16 and 17 are 20,000, 10,000, 250 and 250 ohms respectively. Relay 21 has 3,000 turns in the upper winding with a resistance of 1,000 ohms resistance and 20,000 turns in the lower winding with 3,000 ohms resistance. Capacitance 10 can be 20 microfarads and battery 12, 50 volts.

One embodiment of this invention comprises a conventional neutral relay whose inner armature establishes a holding circuit while it is in its normal, operated condition. One terminal of the relay winding is connected to one side of a unilateral current conducting cell, and the other side of the cell is connected to a resistance-capacitance network which is in turn connected to the source of potential. The circuit constants and potentials are proportioned so that no current passes through the cell to the relay until a predetermined time after the timing action is initiated. After the capacitance of the network charges to a certain potential, a bias potential is removed from the cell and current passes through the cell to the relay. Part of the current which passes through the cell flows through a first winding of the relay so as to create a magnetic force which opposes the magnetic force created by a holding current which flows through a second winding of the relay, thereby causing the armature to release. When the armature releases, it opens contacts which reverse the polarity of the potential on the cell thereby stopping all current flow in the relay winding. The outer armature serves to open or close contacts associated with an external circuit such as a telephone system.

Referring to Fig. 1, when switch 14 is closed the current required to operate the armatures of relay 18 flows from battery 12 through switch 14, the winding of relay 18, and resistor 17 back to battery 12. As soon as the armatures operate, the circuit across the load is completed and a holding circuit is also established through resistor 15 to ground. Furthermore, while switch 14 is closed, any charge appearing upon condenser 10 is dissipated in cell 13 because said cell is poled in such a direction as to offer easy passage to the current from said condenser.

The timing action herein referred to begins at the time switch 14 is opened. The opening of switch 14 causes a negative bias to be applied to the right-hand side of cell 13. The left-hand side of cell 13 remains at substantially ground potential because the condenser must consume some finite interval of time in charging. Because there is now a holding current flowing from ground through resistance 15, relay 18, resistance 17 back to battery 12, the potential on the right-hand side of cell 13 is negative with respect to ground due to the voltage drop across resistance 15. Cell 13 is therefore biased in such direction as to offer its greatest opposition to the flow of current therethrough.

Condenser 10 begins to charge with current supplied through resistor 11 and the armature of relay 18 is maintained operated as a result of the holding current which flows from ground through the inner armature of relay 18, resistor 15, winding of relay 18, resistor 17, to battery 12. Resistor 15 is proportioned to the other circuit components so that the holding current is just enough to maintain the armature operated. Condenser 10 charges until its potential is more negative than the potential on the right side of cell 13 at which time a current can flow through cell 13. Thus a circuit path to battery 12, alternate to the path through relay 18 winding, is provided for current flowing through resistance 15. The current through resistance 15 will therefore increase and the voltage drop across said resistance will also increase in a negative direction, thus lessening the current through relay 18. Condenser 10 will then collect a greater negative charge and the drop across resistance 15 will become accordingly greater, eventually lowering the potential drop across relay 18 winding until it is insufficient to maintain said relay 18 in an operated condition, whereupon it will release.

This operation can perhaps be more clearly understood from Fig. 3 wherein the circuit is drawn in the conventional form of a bridge network. It is assumed that switch 14 has just been opened. Initially there is no charge on condenser 10 for reasons discussed supra, and as a result the opening of switch 14 places a negative bias on the right-hand side of cell 13 by removing the short circuit from resistance 15 and causing a current to flow through said resistance 15, thereby creating a voltage drop across said resistance 15. When condenser 10 has been charged to a value just greater than voltage drop across resistance 15, cell 13 becomes capable of conducting a current. This will increase the current flow through resistance 15 and will divert some of the current that had been flowing through the winding of relay 18 through the cell 13.

Since the current flow through resistance 15 is increased, the voltage drop across said resistance must also increase which will allow condenser 10 to charge to a greater negative value which in turn will allow more current to flow through resistor 15. Eventually the bridge network approaches a balanced condition and there is insufficient current flowing through the winding of relay 18 to maintain the relay in an operated condition. Thereupon the relay 18 will release and the lower spring contact of said relay will open breaking the circuit to battery 12. The spring 19 shown in Fig. 1 will cause the armature to release before the flux therein reaches zero magnitude. As soon as the armature releases, current ceases to flow through the winding of the relay, and cell 13 ceases to conduct current. The right-hand side of cell 13 is immediately raised to a potential equal to that of source 12, and the left-hand side of the cell is slowly raised to the same potential as condenser 10 attains a full charge. The circuit is restored to normal by the closure of switch 14 which reoperates the relay and discharges the condenser 10, and the timing action may be initiated again by the opening of the switch as described above.

The timing action of the apparatus described above is largely controlled by the time constant of the resistance-capacitance network and the action is only slightly affected by the adjustment of the relay; therefore an accurate adjustment of the relay release time can be made by adjusting the resistance of resistor 11 or the capacitance of condenser 10.

The apparatus disclosed in Fig. 2 achieves the same result as that disclosed in Fig. 1. However, the former utilizes a two-winding relay instead of the single-winding relay utilized in the latter.

Referring to Fig. 2, while switch 20 is closed the armatures of relay 21 are operated as a result of current flowing from battery 12 through the upper winding of the relay and the upper section of switch 20 to ground. While the relay armatures are operated, the circuit across the load is shorted and a holding circuit is established through resistor 15. The lower section of switch 20 serves to connect the negative terminal of battery 12 to the left-hand side of unilateral cell 13 so as to bias the cell and thereby render it non-conducting so that no current flows through the lower winding of relay 21. When switch 20 is opened, the armatures of relay 21 are maintained operated as a result of current flowing from battery 12 through the upper winding of relay 21, resistor 15, and the inner armature of relay 21 to ground. The circuit components are proportioned so that the magnetomotive force generated by the holding current is just enough to hold the relay armatures operated. The potential applied to the right-hand side of cell 13 is determined by the voltage divider comprising resistors 17 and 16, and the potential applied to the left-hand side of cell 13 is determined by the potential across condenser 10. While switch 20 is operated, the potential across condenser 10 is zero. As soon as switch 20 is opened, condenser 10 begins to charge through resistor 11, and the potential across condenser 10 rises in an exponential manner. When the potential on the right side of cell 13 becomes slightly more negative than that on the left side of the cell, the cell offers a low impedance to current flowing from battery 12 through the inner armature of relay 21, resistor 11, cell 13, the lower winding of relay 21, resistor 17 back to battery 12. This current is passed through the lower winding in a direction so that the magnetomotive force thereby generated is opposed to that generated by the current flowing in the upper winding. When the magnetic flux generated by current flowing in the upper winding less the magnetic flux generated by current flowing in the lower winding equals the magnetic flux at which the armatures are adjusted to release, the armatures release and the circuit across the load is opened. Since the time required for the relay armatures to release after the rectifier starts conducting is small compared to the time it takes the condenser to charge to potential at which conduction starts in the rectifier, the releasing time of the relay is largely determined by the time constant of the resistance-capacitance network and is therefore only slightly influenced by the relay adjustment. As before, an accurate adjustment of the relay release time can be made by adjusting the resistance of resistor 11 or the capacitance of condenser 10.

When the relay armatures release the flow of current through both the relay windings is interrupted. In order to restore the apparatus switch 20 is closed, thereby permitting a current to flow in the upper winding of the relay and biasing cell 13 so that practically no current is permitted to flow through the lower relay winding. The relay armatures operate as soon as sufficient magnetic flux is generated by current in the upper winding, and the apparatus is now in condition to again perform the above-described timing action.

The circuit element designated as Load in Figs. 1 and 2 may be any electrical circuit which is used in conjunction with a slow-releasing relay. It is apparent that additional armatures and contacts may be added to the relay structure and used with external circuits without departing from the scope of the invention.

Although specific embodiments of this invention have been shown and described, it will be understood that modifications may be made therein without departing from the scope and spirit thereof as defined by the appended claims.

What is claimed is:

1. In combination, a relay including a winding, a switch, a power supply circuit under the control of said switch for energizing said winding whenever said switch is closed thereby to operate said relay, a holding circuit under the control of said relay and including an impedance element in series with said winding for maintaining said relay operated from said supply circuit when said switch is opened after an initial closure, a resistor, a capacitor, a circuit under the control of said switch for charging said capacitor from said supply circuit through said resistor only when said switch is open, a unilateral current conducting voltage responsive device connecting said resistor and capacitor to said impedance, said device being voltage biased so as to offer a high impedance to current tending to flow through said impedance and between said impedance and the resistor-capacitor circuit during the initial period of time after said switch is opened, the opening of said switch causing said capacitor to charge whereby a predetermined time interval after the opening of said switch the said device becomes voltage biased so as to offer a low impedance to the flow of current through said impedance and between said impedance and the resistor-capacitor circuit thereby increasing the voltage drop across the said impedance to effect the release of said relay.

2. In combination, a relay including a winding, a switch, a power supply circuit under the control of said switch for energizing said winding whenever said switch is closed thereby to operate said relay, a holding circuit under the control of said relay and including an impedance element in series with said winding for maintaining said relay operated from said supply circuit when said switch is opened after an initial closure, a resistor, a capacitor, a circuit under the control of said switch for charging said capacitor from said supply circuit through said resistor only when said switch is open, a unilateral current conducting voltage responsive device connecting said resistor and capacitor to said impedance, said device being voltage biased so as to offer a high impedance to current tending to flow through said impedance to the resistor-capacitor circuit during the initial period of time after said switch is opened, the opening of said switch causing said capacitor to charge whereby a predetermined time interval after the opening of said switch the said device becomes voltage biased so as to offer a low impedance to the flow of current through said impedance to the resistor-capacitor circuit thereby increasing the voltage drop across the said impedance to effect the release of said relay.

3. An electrical power supply circuit, an electromagnetic relay, an energizable winding for operating said relay, a first switch having an open and a closed condition, a second switch controlled by said relay and having an open and a closed condition according to the respective non-operated and operated conditions of said relay, said first switch arranged when operated to connect one terminal of said winding directly to said supply circuit thereby to operate said relay, an impedance, said second switch arranged when operated to connect said one terminal to said supply circuit in series through said impedance thereby to hold operated said relay when said first switch is opened, a conductor, circuit means controlled by said first switch for deriving from said supply circuit and for applying to said conductor a voltage, said first switch arranged when operated to cause said circuit means to derive and to apply to said conductor a fixed voltage, said first switch arranged when open to cause said circuit means to derive and to apply to said conductor a voltage which changes from said fixed voltage according to a predetermined elapsed time relationship after said first switch is opened, and a unilateral current conducting voltage responsive device connected between said conductor and said one terminal.

4. A direct-current electrical power supply circuit, an electromagnetic relay, an energizable winding for operating said relay, a first switch having an open and a closed condition, a second switch controlled by said relay and having an open and a closed condition according to the respective non-operated and operated conditions of said relay, said first switch arranged when operated to connect one terminal of said winding directly to said supply circuit thereby to operate said relay, a resistance, said second switch arranged when operated to connect said one terminal to said supply circuit in series through said resistance thereby to hold operated said relay when said first switch is open, a conductor, a time delay circuit controlled by said first switch for deriving from said supply circuit and for applying to said conductor a voltage, said first switch arranged when operated to cause said delay circuit to derive and to apply to said conductor a fixed voltage, said first switch arranged when open to cause said delay circuit to derive and to apply to said conductor a voltage which changes from said fixed voltage according to a predetermined elapsed time relationship after said first switch is opened, and a unilateral-current conducting voltage responsive device connected between said conductor and said one terminal.

5. A direct-current electrical power supply circuit, an electromagnetic relay, an energizable winding for operating said relay, a first switch having an open and a closed condition, a second switch controlled by said relay and having an open and a closed condition according to the respective non-operated and operated conditions of said relay, said first switch arranged when operated to connect one terminal of said winding directly to one polarity of said supply circuit thereby to operate said relay, a resistance, said second switch arranged when operated to connect said one terminal to said one polarity of said supply circuit in series through said resistance thereby to hold operated said relay when said first switch is open, a conductor, a resistance-capacity time delay circuit controlled by said first switch for deriving from said supply circuit and for applying to said conductor a voltage, said first switch arranged when operated to cause said delay circuit to derive and to apply to said conductor a fixed voltage, said first switch arranged when open to cause said delay circuit to derive and to apply to said conductor a voltage which changes exponentially from said fixed voltage after said first switch is open, and a unilateral-current conducting voltage responsive device connected between said conductor and said one terminal.

6. A direct-current electrical power supply circuit, an electromagnetic relay, an energizable winding for operating said relay, a first switch having an open and a closed condition, a second switch controlled by said relay and having an open and a closed condition according to the respective non-operated and operated conditions of said relay, said first switch arranged when operated to connect one terminal of said winding directly to one polarity of said supply circuit thereby to operate said relay, a resistance, said second switch arranged when operated to connect said one terminal to said one polarity of said supply circuit in series through said resistance thereby to hold operated said relay when said first switch is open, a conductor, a condenser connected between said conductor and said one polarity of said supply circuit, a second resistance connected between said conductor and the other polarity of said supply circuit, and a unilateral-current conducting voltage responsive device connected between said conductor and said one terminal, said first switch arranged when operated to cause said condenser to be discharged through said device, said first switch arranged when open to cause said condenser to derive and to apply to said conductor a voltage which changes exponentially after said first switch is open.

THOMAS L. DIMOND.

REFERENCES CITED

The following references are of record in the file of this patent:

UNITED STATES PATENTS

| Number | Name | Date |
| --- | --- | --- |
| 2,111,632 | Kannenberg | Mar. 22, 1938 |
| 2,393,014 | Bartholy | Jan. 15, 1946 |